United States Patent
Tsai et al.

(10) Patent No.: US 11,461,640 B2
(45) Date of Patent: Oct. 4, 2022

(54) MITIGATION OF CONDUCTANCE DRIFT IN NEURAL NETWORK RESISTIVE PROCESSING UNITS

(71) Applicant: INTERNATIONAL BUSINESS MACHINES CORPORATION, Armonk, NY (US)

(72) Inventors: HsinYu Tsai, San Jose, CA (US); Stefano Ambrogio, San Jose, CA (US); Pierce I-Jen Chuang, Briarcliff Manor, NY (US); Geoffrey Burr, Cupertino, CA (US); Pritish Narayanan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 839 days.

(21) Appl. No.: 16/388,320

(22) Filed: Apr. 18, 2019

(65) Prior Publication Data

US 2020/0334525 A1 Oct. 22, 2020

(51) Int. Cl.
*G06N 3/08* (2006.01)
*G06N 3/04* (2006.01)

(52) U.S. Cl.
CPC .............. *G06N 3/08* (2013.01); *G06N 3/04* (2013.01)

(58) Field of Classification Search
CPC .................................. G06N 3/08; G06N 3/04
See application file for complete search history.

(56) References Cited

U.S. PATENT DOCUMENTS

| 10,489,700 | B1* | 11/2019 | Asnaashari | G11C 13/0069 |
| 2017/0124025 | A1* | 5/2017 | Gokmen | G06F 9/3887 |
| 2017/0286830 | A1 | 10/2017 | El-Yaniv et al. | |
| 2018/0253642 | A1 | 9/2018 | Gokmen et al. | |
| 2018/0268220 | A1 | 9/2018 | Lee et al. | |
| 2018/0268284 | A1 | 9/2018 | Ren et al. | |
| 2019/0171428 | A1* | 6/2019 | Patton | G06F 8/60 |
| 2019/0244088 | A1* | 8/2019 | Yang | G06N 3/061 |
| 2020/0160186 | A1* | 5/2020 | Lesso | G06N 3/0635 |
| 2020/0227635 | A1* | 7/2020 | Yang | H01L 45/146 |

(Continued)

FOREIGN PATENT DOCUMENTS

WO 2018/184187 10/2018

OTHER PUBLICATIONS

Kim, Seyoung, et al. "Analog CMOS-based resistive processing unit for deep neural network training." 2017 IEEE 60th International Midwest Symposium on Circuits and Systems (MWSCAS). IEEE, 2017. (Year: 2017).*

(Continued)

*Primary Examiner* — Utpal D Shah
(74) *Attorney, Agent, or Firm* — Tutunjian & Bitetto, P.C.; Randall Bluestone

(57) ABSTRACT

Methods and systems for performing calculations with a neural network include determining a conductance drift coefficient for resistive processing unit (RPU) weights in a neural network. A correction factor is applied to neuron inputs in the neural network in accordance with the drift coefficient and a time that has elapsed since the RPU weights were programmed. A calculation is performed with the neural network. The correction factor compensates for conductance drift.

20 Claims, 6 Drawing Sheets

(56) References Cited

U.S. PATENT DOCUMENTS

2022/0115067 A1* 4/2022 Mackin .................. G06N 3/08

OTHER PUBLICATIONS

Boybat, Irem, et al. "Impact of conductance drift on multi-PCM synaptic architectures." 2018 Non-Volatile Memory Technology Symposium (NVMTS). IEEE, 2018. (Year: 2018).*
Wang, Zhongrui, et al. "Fully memristive neural networks for pattern classification with unsupervised learning." Nature Electronics 1.2 (2018): 137-145. (Year: 2018).*
Nandakumar, S. R., et al. "A phase-change memory model for neuromorphic computing." Journal of Applied Physics 124.15 (2018): 152135. (Year: 2018).*
Jungwood Choi et al., "Bridging the Accuracy Gap for 2-bit Quantized Neural Networks (QNN)", Computer Science > Computer Vision and Pattern Recognition, Jul. 2018.
Stefano Ambrogio et al., "Equivalent-accuracy accelerated neural-network training using analogue memory", Nature 558, Jun. 2018, pp. 60-67.
Jason Brownlee, "A Gentle Introduction to Concept Drift in Machine Learning", Understand Machine Learning Algorithms, Dec. 2017.
Manu V Nair et al., "Gradient-descent-based learning in memristive crossbar arrays", 2015 International Joint Conference on Neural Networks (IJCNN), Killarney, Jul. 2015, pp. 1-7.
Shubham Jain et al., "Rx-Caffe: Framework for evaluating and training Deep Neural Networks on Resistive Crossbars", Computer Science > Emerging Technologies, Aug. 2018.
Lijun Wang et al., "Visual Tracking with Fully Convolutional Networks", 2015 IEEE International Conference on Computer Vision (ICCV), Santiago, Dec. 2015, pp. 3119-3127.

* cited by examiner

MITIGATION OF CONDUCTANCE DRIFT IN NEURAL NETWORK RESISTIVE PROCESSING UNITS

BACKGROUND

The present invention generally relates to neural network processing systems and, more particularly, to compensating for drift in conductance values in neural network weights.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Referring now to FIG. 1, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There can be any number of layers of hidden neurons 104, and as well as neurons that perform different functions. There exist different neural network structures as well, such as convolutional neural network, recurrent neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

SUMMARY

A method for performing calculations with a neural network includes determining a conductance drift coefficient for resistive processing unit (RPU) weights in a neural network. A correction factor is applied to neuron inputs in the neural network in accordance with the drift coefficient and a time that has elapsed since the RPU weights were programmed. A calculation is performed with the neural network. The correction factor compensates for conductance drift.

A system for performing calculations with a neural network includes a neural network that includes RPU weights. A drift correction module is configured to determine a conductance drift coefficient for the RPU weights, to apply a correction factor to neuron inputs in the neural network in accordance with the drift coefficient and a time that has elapsed since the RPU weights were programmed. The correction factor compensates for conductance drift during calculations performed by the neural network.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide mitigation for conductance drift effects in hardware-based neural network weights. In particular, weights can be implemented using resistive processing units (RPUs), where a resistance of the RPU determines the value of the weight. Such structures can be used to reduce energy consumption and speed of processing by performing parallelized operations in the analog domain, at the location of data storage in memory.

However, devices such as phase change memory devices can exhibit conductance drift over time due to structural relaxation and defect annealing in crystalline and amorphous portions of the device. The change of the conductance G of an RPU over time can be modeled as $$G = G_0 \left(\frac{t}{t_o}\right)^{-\nu},$$

where $G_0$ is an initial programmed value of the RPU, t is the current time, $t_0$ is the time at which $G_0$ is measured after the end of the last programming pulse, and $\nu$ is the drift coefficient that characterizes how rapidly conductance drift occurs. An exemplary value of $t_0$ for a phase change memory device can be about $1 \cdot 10^{-5}$. The time $t_0$ is measured from the end of the last programming pulse. In other words, it is the time since the last external excitation that causes any change in the device. In practice, $t_0$ can be any time after programming, as long as it corresponds with the time that $G_0$ was measured, because the equation can be reorganized to state $Gt^\nu$ as a constant over time.

To address this problem, the present embodiments first apply a correction factor to an activation function in the neural network's neurons. This correction factor removes most of the drift. The present embodiments can also provide quantization of the conductance values to make them less sensitive to drift and re-quantize these values over time to help track the drift that occurs.

Figure 1:
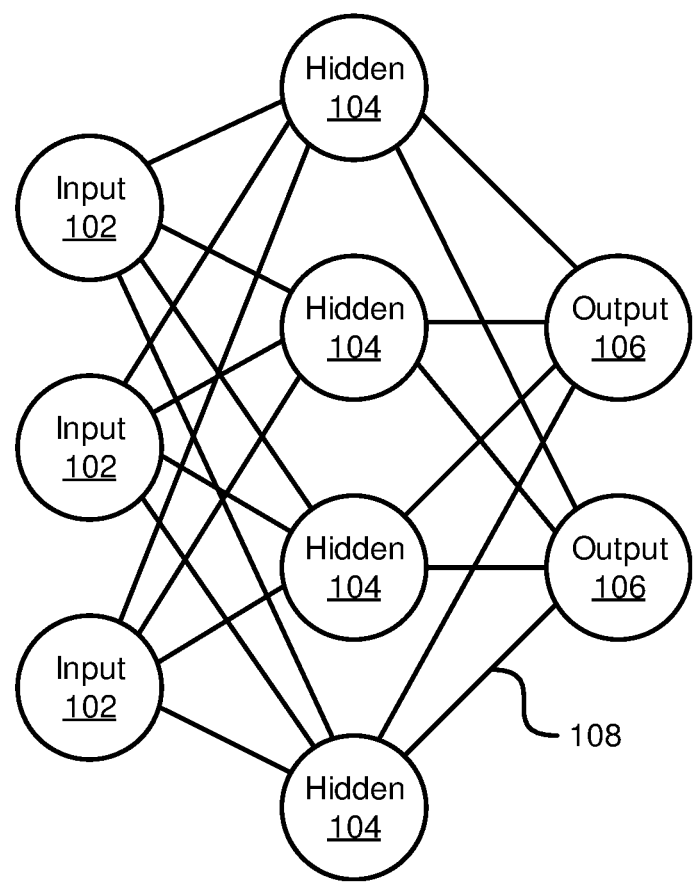
FIG. 1 is a diagram of a neural network.
Figure 2:
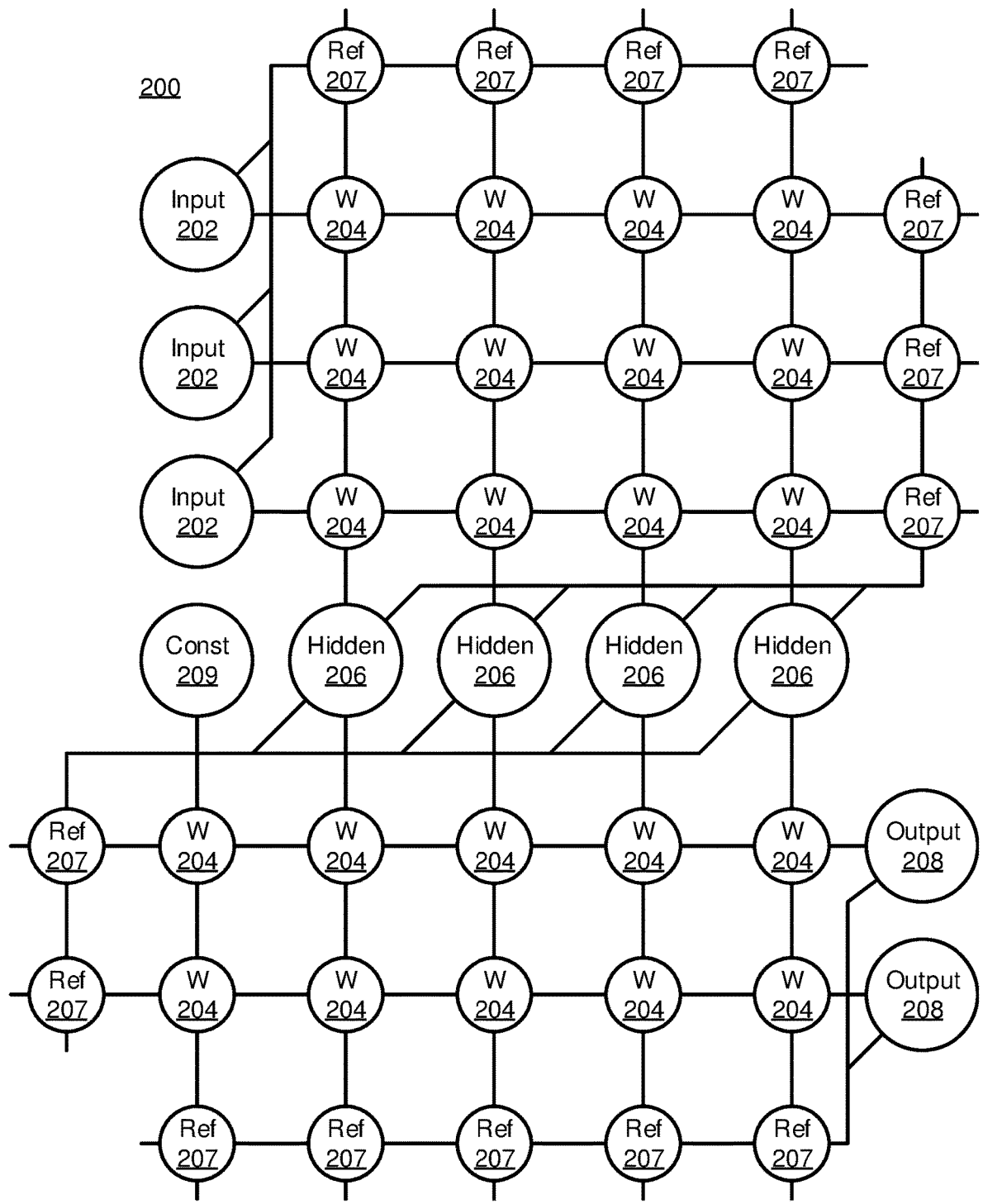
FIG. 2 is a diagram of a neural network that includes hardware weights that exhibit conductance drift over time in accordance with an embodiment of the present invention.

Referring now to the drawings in which like numerals represent the same or similar elements and initially to FIG. 2, an artificial neural network (ANN) architecture 200 is shown. It should be understood that the present architecture is purely exemplary and that other architectures or types of neural network can be used instead. In particular, while a hardware embodiment of an ANN is described herein, it should be understood that neural network architectures can be implemented or simulated in software. However, because conductance drift is The hardware embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, attention layers, softmax layers, or any other appropriate type of neural network layer. Furthermore, layers can be added or removed as needed and the weights can be omitted for more complicated forms of interconnection.

During feed-forward operation, a set of input neurons 202 each provide an input voltage in parallel to a respective row of weights 204. In the hardware embodiment described herein, the weights 204 each have a settable resistance value, such that a current output flows from the weight 204 to a respective hidden neuron 206 to represent the weighted input. In software embodiments, the weights 204 can simply be represented as coefficient values that are multiplied against the relevant neuron outputs.

Each neuron 202 has an activation function that is used to perform a function on the incoming value. Any appropriate activation function can be implemented in the neurons 202, including for example tanh, sigmoid, rectifier linear unit (ReLU), and clipped ReLU functions. Each neuron 202 thus takes some input value and outputs a respective output signal according to its respective activation function.

Following the hardware embodiment, the current output by a given weight 204 is determined as $$I = \frac{V}{r},$$

where V is the input voltage from the input neuron 202 and r is the set resistance of the weight 204. The current from each weight adds column-wise and flows to a hidden neuron 206. A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values. The use of reference weights 207 is not needed in software embodiments, where the values of outputs and weights can be precisely and directly obtained. As an alternative to using the reference weights 207, another embodiment can use separate arrays of weights 204 to capture negative values.

The hidden neurons 206 use the currents from the array of weights 204 and the reference weights 207 to perform some calculation. The hidden neurons 206 then output a voltage of their own to another array of weights 204. This array performs in the same way, with a column of weights 204 receiving a voltage from their respective hidden neuron 206 to produce a weighted current output that adds row-wise and is provided to the output neuron 208.

It should be understood that any number of these stages can be implemented, by interposing additional layers of arrays and hidden neurons 206. It should also be noted that some neurons can be constant neurons 209, which provide a constant output to the array. The constant neurons 209 can be present among the input neurons 202 and/or hidden neurons 206 and are only used during feed-forward operation.

During back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 combine the weighted feedback signal with a derivative of its feed-forward calculation and stores an error value before outputting a feedback signal voltage to its respective column of weights 204. This back propagation travels through the entire network 200 until all hidden neurons 206 and the input neurons 202 have stored an error value.

During weight updates, the input neurons 202 and hidden neurons 206 apply a first weight update voltage forward and the output neurons 208 and hidden neurons 206 apply a second weight update voltage backward through the network 200. The combinations of these voltages create a state change within each weight 204, causing the weight 204 to take on a new resistance value. In this manner the weights 204 can be trained to adapt the neural network 200 to errors in its processing. It should be noted that the three modes of operation, feed forward, back propagation, and weight update, do not overlap with one another.

As noted above, the weights 204 can be implemented using resistive cross point devices. Such resistive devices can have switching characteristics that have a non-linearity that can be used for processing data. The weights 204 can belong to a class of device called a resistive processing unit (RPU). The RPU devices can be implemented with resistive random access memory (RRAM), phase change memory (PCM), programmable metallization cell (PMC) memory, or any other device that has non-linear resistive switching characteristics. Such RPU devices can also be considered as memristive systems.

Figure 3:
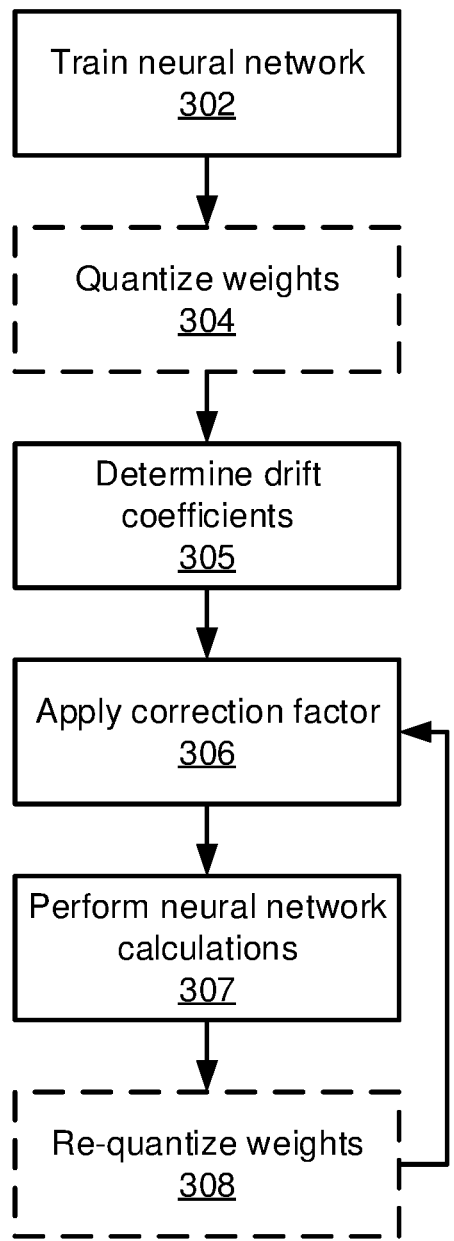
FIG. 3 is a block/flow diagram of a process for performing calculations using a neural network that includes hardware weights that exhibit conductance drift over time in accordance with an embodiment of the present invention.

Referring now to FIG. 3, a method for performing neural network calculations is shown. Block 302 performs an initial training of the neural network. It is specifically contemplated that training can be performed using a set of training data that includes two parts, with a first part being used to perform an initial training step and a second part being used to verify that the training was performed accurately. Any errors are then backpropagated to adjust the values of the weights 204 in the neural network. This training process thereby sets the initial conductance value of the neural network RPUs, which then begins to drift over time.

To make the values of the weights 204 resistant to read/write noise and conductance drift, block 304 optionally quantizes the weight values. Thus, instead of being purely analog, the range of possible conductance values for a weight is divided into sections, with each section corresponding to a respective weight value. The conductance range can be divided into any appropriate number of sections. The sections can be equal in size or can, alternatively, be different sizes.

Block 305 determines the drift coefficients for the weights 204. The drift coefficient is a fixed value for each memory device once the device has been programmed to a certain value during training. However, the drift coefficient can vary from device to device and from cycle to cycle when the weights 204 go through a full reset. In some embodiments, a drift coefficient can be determined for use across all devices using a set of calibration devices to determine aggregate behavior on overall conductance changes. The drift coefficient can be measured by measuring device conductance over time and plotting G versus t on a log-log graph to find the slope.

Block 306 then applies a correction factor to the activation function of the neurons in the neural network. This step will be described in greater detail below, but block 306 determines a current correction actor based on the time and a drift coefficient and applies that correction factor to the activation function input to compensate for drift in the conductance values of the weights 204.

Using the corrected activation functions, block 308 then performs calculations that can tolerate more conductance drift and that can completely eliminate accuracy loss as a result of conductance drift in the case where all devices have the same drift coefficient. The calculations of block 308 can perform any appropriate calculation, as it is a general principle of neural networks that they can replicate any function. Such functions include, for example, image classification, machine learning, artificial intelligence, self-driving cars, processing real-time sensor data and inferences for internet of things devices, and may others. By preventing the loss of accuracy that would result from conductance drift, hardware neural networks can be used to increase processing speed and efficiency without risk.

Block 310 determines whether re-quantization is needed for the weight values and performs such re-quantization. As the conductance values of the weights 204 drift, re-quantization is needed to adjust the corresponding value ranges. Re-quantization can be performed periodically or, alternatively, responsive to the magnitude of the conductance drift, with larger values for the drift necessitating more frequent re-quantization. It should be noted that quantization and re-quantization in blocks 304 and 310 are optional, as the correction factor addresses the drift in conductance values, but using quantization can help prevent read/write noise from substantially affecting calculation outcomes.

Figure 4:
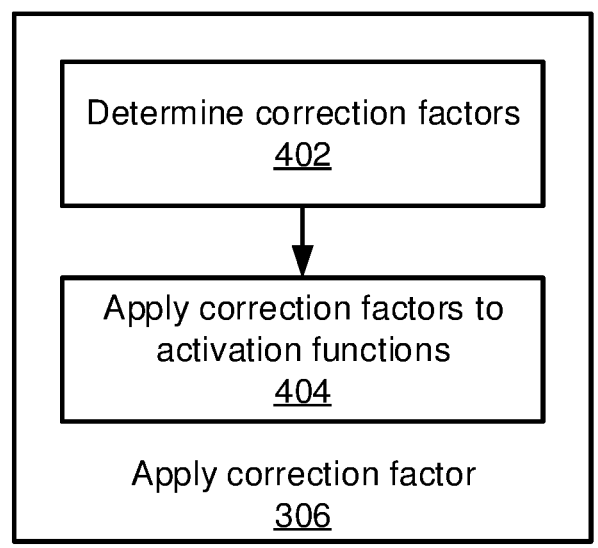
FIG. 4 is a block/flow diagram of a process for determining a conductance drift correction factor in accordance with an embodiment of the present invention.

Referring now to FIG. 4, additional detail is provided regarding the application of the correction factor in block 306. Block 402 determines correction factors for the respective neuron activation functions based on the drift coefficients determined in block 305. In particular, for an activation function $f$, the output $x_2$ of a neuron that accepts an input $x_1$ can be expressed as:

$$x_2 = f\left(b \cdot \left(\frac{t}{t_0}\right)^{-v} \sum w_0 x_1\right)$$

where b represents a slope of the activation function and $w_0$ represents a set of weights that provide their respective outputs $x_1$ to the neuron 202. The neuron 202 thus sums across all its inputs, with the conductance drift factor changing the values of those inputs over time.

To compensate for this drift, block 402 determines the value of $$\left(\frac{t}{t_0}\right)^{-v}$$

(the conductance drift) and block 404 applies an inverse factor to the input:

$$x_2 = f\left(b \cdot \left(\frac{1}{\left(\frac{t}{t_0}\right)^{-v}}\right)\left(\frac{t}{t_0}\right)^{-v} \sum w_0 x_1\right)$$

It should be noted that the drift coefficient v can have a distribution of values across the various devices. In some embodiments, a respective drift coefficient can be determined for each value. In other embodiments, the distribution can be approximated as a log-normal function and the mode value of the drift coefficients can be used to correct all of the activation functions. Typical values for the drift coefficient of a phase change memory weight range between about 0.01 and about 0.1. Assuming that the drift coefficient distribution has a relatively narrow distribution, this slope correction can remain accurate for long periods of time. Once the drift coefficient has been determined for a trained neural network, it can be kept constant until the values of the neural network weights change, with changes to the correction factor being determined by the time. Even after a year of use, the correction factor can be kept relatively small (e.g., less than about 4), making it reasonable for implementation in the neural network circuits. Although the mode is specifically described herein to approximate the distribution, other functions, such as the mean or median, can be used instead. The mode generally provides better results with log-normal distributions, while the mean generally provides better results for Gaussian distributions, but mean can also be used for other distributions when determining the mode would be too difficult.

In some embodiments, the correction factor can be obtained by an additional calibration column in the neural network, in which the average conductances of the weights 204 are monitored. The correction factor can then be based on the ratio between an initial conductance and a current conductance. Thus, the correction factor can be determined according to:

$$\frac{W_0}{W} = \frac{G_0}{G}$$

where $W_0$ represents the initial weight, W represents a current weight, $G_0$ represents an initial conductance, and G represents a current conductance.

Alternatively, the time constant $t_0$ and the drift coefficient distribution can be measured before setting the analog conductances for the weights. The time constant $t_0$ can be measured from the last programming time using, e.g., an on-chip clock that resets every time the weights 204 are programmed. Using the calibrated values of $t_0$ and v, the amount of time since programming is tracked. The correction factor can then be calculated as described above. It should be noted that the drift coefficient is a function of device geometry and the materials used to form the weights. Even though the particular drift coefficient for each device changes from device to device and from cycle to cycle, the distribution itself is consistent for a particular set of devices.

While the application of the correction factor substantially improves accuracy over time, read and write noise also diminish the accuracy of the neural network, and the sensitivity to noise increases as the conductance values of the devices decay. Read noise refers to inconsistency in the value read out from a particular weight 204 in one read operation relative to the next, while write noise refers to imprecision in the written value, which can deviate from the intended value. Accuracy is decreased by both read and write noise, but read noise generally has a more severe effect.

Block 304 therefore optionally quantizes the weights and/or the activation function for forward inference during the training process. Weight quantization is only used during feed forward operations. Back propagation and gradient descents for weight updates are done to a high precision (e.g., 32-bit floating point). The weight values themselves are stored in high precision, with a quantized copy being sent through forward inference.

Various types weight quantization can be used. In one example, a maximum absolute weight value α is determined and then divided by seven to provide seven distinct values. These same values can be used for negative weight values, with a value of zero making a fifteenth quantized level. This can approximate four-bit resolution, with the zero value providing better accuracy than a true four-bit resolution would provide. Other embodiments can have two-bit resolution, with values of [−α, −0.25α, 0.25α, α]. In this case, zero is not one of the quantization values, but the two inner values are moved closer to zero. For activation quantization, only bounded activations can be quantized, so the range of the activation function determines how the weights will be quantized.

It should be noted that quantization of the activation function does not help with noise resilience before the weights start to decay. After the weights decay, however, and the correction factor has been applied, quantization of the training weights provides increased resilience to noise. In some embodiments, up to 50% read noise can be tolerated by the activation function using two-bit weight and activation quantization and by loading weights in without final quantization.

For write noise, the particular activation function being used is significant. For example, the sigmoid function performs best with write noise, followed by tanh, then ReLU6, then ReLU. With quantized four-bit weights and sigmoid activation, 90% accuracy is maintained even under high write noise (e.g., about 200% of average weight).

Weight re-quantization can then be applied periodically in block 308 to self-correct for conductance drift at each weight. Re-quantization is applied after weight decay to account for the effects of both read and write noise. Periodically, block 308 measures the weights 204 column-by-column to assess their conductance values. The measured conductance is multiplied by the activation function correction factor. The conductance is then quantized against the pre-determined conductance levels and the values of the weights 204 are re-set one column at a time. This does not need data communication with external memory to determine the conductance, as the re-programmed conductance is computed from the measured conductance.

The period for re-quantization is determined based on the magnitude of the read/write noise. Lower read/write noise means that a longer period for re-quantization can be used. The period is set to trigger re-quantization before the expected drift amount exceeds half of the quantization level.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 5:
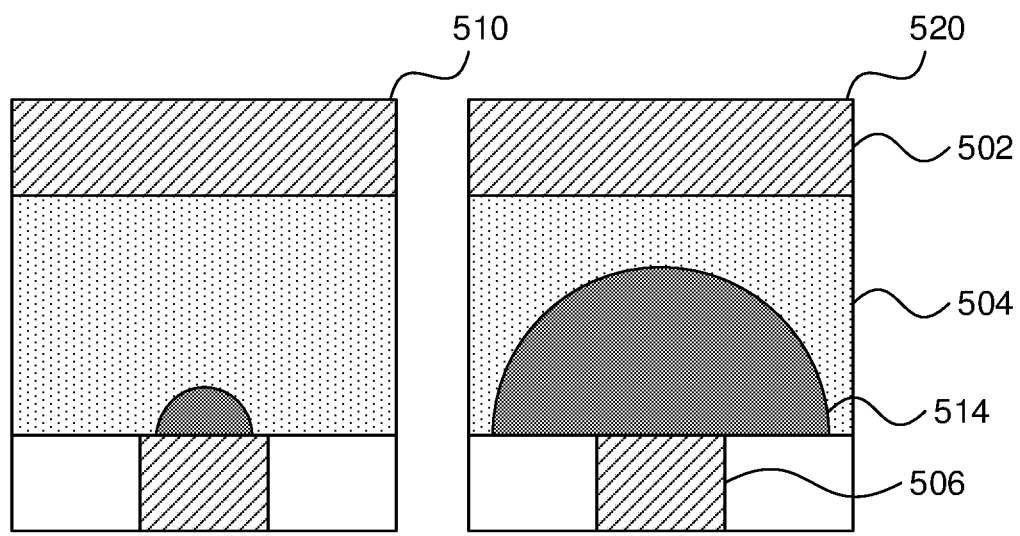
FIG. 5 is a diagram of different states of a phase change material resistive processing unit that exhibits conductance drift over time in accordance with an embodiment of the present invention.

Referring now to FIG. 5 an exemplary PCM structure is shown that can represent a weight 204. The structure is shown in two states, including a first resistance state 510 and a second resistance state 520. The PCM structure includes a first electrode 502, a phase change material in a first phase 504 and a second phase 514, and a second electrode 506. While this geometry is specifically contemplated, it should be understood that any appropriate geometry can be used instead.

In a first resistance state 510, the proportions of the first phase 504 and the second phase 514 in the phase change material differ from those in the second resistance state 910, producing different resistances between the two states. The phase change material can be formed from any appropriate material that has two such resistance states that depend on the phase. Exemplary phase change materials can include, e.g., a chromium-germanium-tellurium alloy such as, e.g., Cr2Ge2Te6 or a germanium-antimony-tellurium alloy such as, e.g., Ge2Sb2Te5. Alternative phase change materials that can be used include Sb2Te3 and GeTe.

The resistance state of each weight 204 can be altered by applying a set current that generates heat within the PCM structure. The heat causes a change in the crystalline structure of a part of the PCM structure, thereby changing the proportions between the first phase 504 and the second phase 514. The state can be reset by heating the PCM structure completely and then allowing it to cool quickly, so that it stays in an amorphous crystalline state. In some embodiments, a second PCM structure can be used in-line with a first PCM structure to form a weight 204 that can be adjusted to either increase or decrease resistance, with switches to selectively change the resistance of each PCM structure. In such embodiments, two different phase change materials can be used, where the resistance changes in opposite directions for each when changed.

Figure 6:
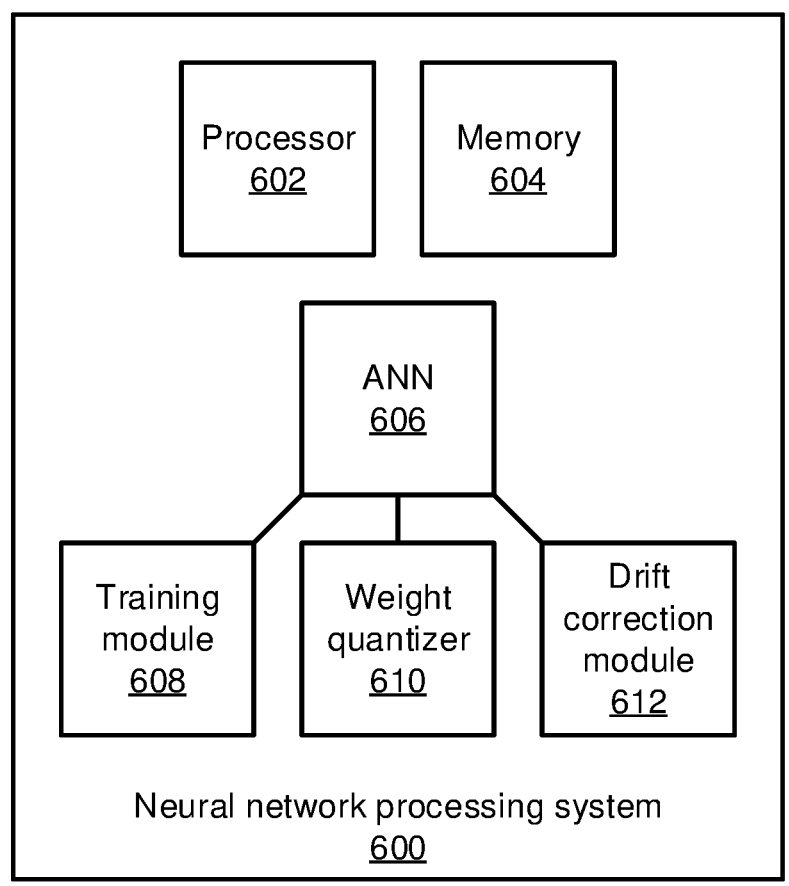
FIG. 6 is a block diagram of a neural network processing system that corrects for conductance drift in the hardware weights of a neural network in accordance with an embodiment of the present invention.

Referring now to FIG. 6, a neural network processing system 600 is shown. The system 600 includes a hardware processor and memory 604. The system 600 also includes an ANN 600 that is implemented with hardware weights, for example in the form of RPUs such as phase change memory devices. The ANN 606 can take the form of any appropriate neural network structure, with any number of neuron layers and any appropriate activation function(s).

The system 600 further includes one or more functional modules. The functional modules can be implemented as software that is stored in the memory 604 and that is executed by the hardware processor. In other embodiments, some or all of the functional modules can be implemented as one or more discrete hardware components, for example in the form of application-specific integrated chips or field programmable gate arrays.

A training module 608 uses a set of training data to determine appropriate values for the hardware weights in the ANN 606 and sets those values in accordance with the type of RPU (e.g., by providing a set current pulse to the weights). A weight quantizer 610 determines conductance value ranges that correspond to particular weight readout values and updates those conductance value ranges periodically as the conductance of the weights drifts. A drift correction module 612 measures a drift coefficient and determines a current correction value based on the amount of time that has elapsed since the ANN 606 was trained. The drift correction module 612 then applies the correction to the inputs to neurons in the ANN 606 to compensate for conductance drift.

Figure 7:
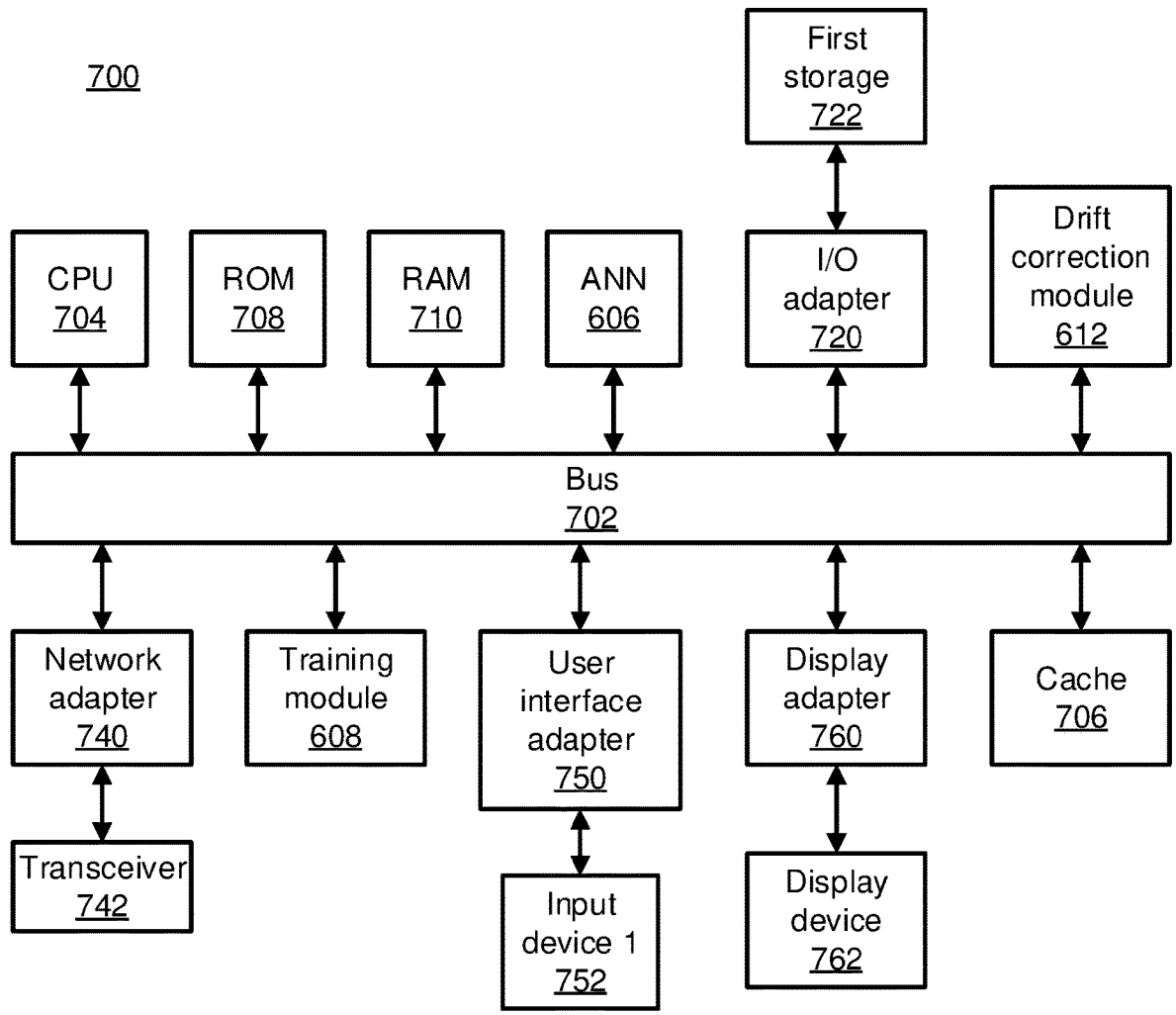
FIG. 7 is a block diagram of a neural network processing system in accordance with an embodiment of the present invention.

Referring now to FIG. 7, an exemplary processing system 700 is shown which may represent the neural network processing system 600. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a network adapter 740, a user interface adapter 750, and a display adapter 760, are operatively coupled to the system bus 702. Also connected to the bus 702 are the ANN 606, the training module 608, and the drift correction module 612.

A first storage device 722 is operatively coupled to system bus 702 by the I/O adapter 720. The storage device 722 can be any of a disk storage device (e.g., a magnetic or optical disk storage device), a solid state magnetic device, and so forth. The storage device 722 can be the same type of storage device or different types of storage devices.

A display device 762 is operatively coupled to system bus 702 by display adapter 760. A first user input device 752 is operatively coupled to system bus 702 by user interface adapter 750. The user input device 75 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input device 752 is used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

Having described preferred embodiments of mitigation of conductance drift in neural network resistive processing units (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for performing calculations with a neural network, comprising:
   determining a conductance drift coefficient for resistive processing unit (RPU) weights in a neural network;
   applying a correction factor to neuron inputs in the neural network in accordance with the drift coefficient and a time that has elapsed since the RPU weights were programmed; and
   performing a calculation with the neural network, wherein the correction factor compensates for conductance drift.

2. The method of claim 1, wherein the conductance drift coefficient is determined according to a distribution of drift coefficients for a plurality of RPU weights.

3. The method of claim 2, wherein the conductance drift coefficient is determined from the distribution using a statistical function selected from the group consisting of the mode of the distribution and the mean of the distribution.

4. The method of claim 1, further comprising quantizing values of the RPU weights.

5. The method of claim 4, further comprising periodically requantizing the values of the RPU weights in accordance with conductance drift.

6. The method of claim 5, wherein requantization is performed before the conductance drift reaches half of a quantization value.

7. The method of claim 1, further comprising determining an amount of conductance drift based on the conductance drift coefficient.

8. The method of claim 7, wherein the correction factor comprises a multiplicative factor that is the inverse of the amount of conductance drift.

9. The method of claim 1, wherein the RPU weights are phase change memory devices that have a settable conductance value that changes over time.

10. The method of claim 1, wherein the correction factor is expressed as:

$$\left(\frac{1}{\left(\frac{t}{t_0}\right)^{-\nu}}\right)$$

where t is a present time, measured from a time of programming, $t_0$ is a test time, measured at some previous time since programming, and v is the drift coefficient.

11. A system for performing calculations with a neural network, comprising:
a neural network that includes resistive processing unit (RPU) weights;
a drift correction module configured to determine a conductance drift coefficient for the RPU weights, to apply a correction factor to neuron inputs in the neural network in accordance with the drift coefficient and a time that has elapsed since the RPU weights were programmed, wherein the the correction factor compensates for conductance drift during calculations performed by the neural network.

12. The system of claim 11, wherein the drift correction module is further configured to determine the conductance drift coefficient according to a distribution of drift coefficients for a plurality of RPU weights.

13. The system of claim 12, wherein the drift correction module is further configured to determine conductance drift coefficient from the distribution using a statistical function selected from the group consisting of the mode of the distribution and the mean of the distribution.

14. The system of claim 11, further comprising a weight quantizer configured to quantize values of the RPU weights.

15. The system of claim 14, wherein the weight quantizer is further configured to requantize the values of the RPU weights in accordance with conductance drift.

16. The system of claim 15, wherein the weight quantizer is further configured to perform requantization before the conductance drift reaches half of a quantization value.

17. The system of claim 11, wherein the drift correction module is further configured to determine an amount of conductance drift based on the conductance drift coefficient.

18. The system of claim 17, wherein the correction factor comprises a multiplicative factor that is the inverse of the amount of conductance drift.

19. The system of claim 11, wherein the RPU weights are phase change memory devices that have a settable conductance value that changes over time.

20. A non-transitory computer readable storage medium comprising a computer readable program for performing calculations with a neural network, wherein the computer readable program when executed on a computer causes the computer to perform the steps of:
determining a conductance drift coefficient for resistive processing unit (RPU) weights in a neural network;
applying a correction factor to neuron inputs in the neural network in accordance with the drift coefficient and a time that has elapsed since the RPU weights were programmed; and
performing a calculation with the neural network, wherein the correction factor compensates for conductance drift.

* * * * *